United States Patent
Lawson et al.

(10) Patent No.: US 12,090,474 B2
(45) Date of Patent: Sep. 17, 2024

(54) FLUIDIZED BED REACTOR SYSTEMS

(71) Applicant: EXXONMOBIL CHEMICAL PATENTS INC., Baytown, TX (US)

(72) Inventors: Kevin W. Lawson, Houston, TX (US); Brett A. Smith, Houston, TX (US); Jason M. Reverendo, Pearland, TX (US)

(73) Assignee: EXXONMOBIL CHEMICAL PATENTS INC., Baytown, TX (US)

( * ) Notice: Subject to any disclaimer, the term of this patent is extended or adjusted under 35 U.S.C. 154(b) by 38 days.

(21) Appl. No.: 17/766,815

(22) PCT Filed: Oct. 21, 2020

(86) PCT No.: PCT/US2020/056586
§ 371 (c)(1),
(2) Date: Apr. 6, 2022

(87) PCT Pub. No.: WO2021/081039
PCT Pub. Date: Apr. 29, 2021

(65) Prior Publication Data
US 2024/0082803 A1    Mar. 14, 2024

Related U.S. Application Data

(60) Provisional application No. 62/926,065, filed on Oct. 25, 2019.

(30) Foreign Application Priority Data

Jan. 20, 2020  (EP) .................................. 20152705

(51) Int. Cl.
*B01J 8/00* (2006.01)
*B01J 8/18* (2006.01)
*B01J 8/24* (2006.01)

(52) U.S. Cl.
CPC ................. *B01J 8/24* (2013.01); *B01J 8/003* (2013.01); *B01J 8/004* (2013.01); *B01J 8/1854* (2013.01); *B01J 2208/00761* (2013.01)

(58) Field of Classification Search
CPC ..... B01J 8/24; B01J 8/003; B01J 8/004; B01J 8/1854; B01J 2208/00761; B01J 8/0015; B01J 8/1827
(Continued)

(56) References Cited

U.S. PATENT DOCUMENTS 5,545,378 A    8/1996 Morterol et al.
5,798,309 A    8/1998 Breuers et al.
(Continued)

FOREIGN PATENT DOCUMENTS

JP    2000053707 A    2/2000

OTHER PUBLICATIONS

Written Opinion and International; Search Report of corresponding PCT application No. PCT/US2020/056586 mailed Feb. 3, 2021.

*Primary Examiner* — Huy Tram Nguyen
(74) *Attorney, Agent, or Firm* — Vorys, Sater, Seymour and Pease LLP

(57) ABSTRACT

A fluidized reactor system includes a reactor containing a fluidized bed situated above a distributor plate arranged within the reactor, a fluidizing gas fed into the fluidized bed via the distributor plate to cause uniform fluidization of the fluidized bed and promote creation of solid polymeric granules, and a valve assembly penetrating a sidewall of the reactor to remove a mixture of the fluidizing gas and the solid polymeric granules from the fluidized bed. The valve assembly is coupled to the sidewall at a downward angle relative to the sidewall such that an upward-facing opening of the valve assembly extends into the fluidized bed.

20 Claims, 2 Drawing Sheets

(58) Field of Classification Search
USPC .......................................................... 422/145
See application file for complete search history.

(56) References Cited

U.S. PATENT DOCUMENTS

2004/0213706 A1   10/2004   Kivela et al.
2010/0273971 A1   10/2010   Bergstra et al.

FLUIDIZED BED REACTOR SYSTEMS

CROSS-REFERENCE TO RELATED APPLICATIONS

This application claims the priority benefit of U.S. Ser. No. 62/926,065, filed Oct. 25, 2019, and EP 20152705.8, filed Jan. 20, 2020, the disclosures of which are incorporated herein by reference.

FIELD OF THE INVENTION

The present invention relates to polymerization reactor systems and in particular to valve design, arrangement and use in fluidized bed reactors.

BACKGROUND

Polyolefins are polymeric materials produced from olefins and are commonly used in the manufacture of packaging, household goods, automotive components, etc. Polyolefins, such as polyethylene (PE) and polypropylene (PP), can be produced in a fluidized reactor (such as a fluidized bed reactor, preferably a gas phase fluidized bed reactor) that facilitates a polymerization reaction in the presence of a catalyst. Briefly, an active catalyst is fed into the reactor, typically into the volume of a fluidized bed contained within the reactor, and in the form of a nascent catalyst granule, a prepolymerized catalyst granule or a polymer granule containing a residual catalyst, such as in the manufacture of Impact Copolymer Polypropylenes. One or more gases (e.g., ethylene, propylene, hydrogen, etc.) are circulated through the fluidized bed up and out the top of the reactor to a heat exchanger—to remove the heat of polymerization—into a circulating compressor/blower, and are redistributed into the fluidized bed by a plate arranged near the bottom of the reactor. The gases are circulated in various concentrations through the fluidized bed to fluidize the bed and control product properties and production rate; fresh gases are added to the circulating stream to maintain the target concentration within the fluidized bed. The incoming catalyst and/or polymer undergoes polymerization within the fluidized bed to generate solid polymeric granules such as polyethylene and/or polypropylene. A mixture of the solid polymeric granules and the gases is continuously or semi-continuously removed from the reactor and conveyed to a granules handling system where the solid polymeric granules are separated from the gas as product, and the gas is recovered, treated, and recycled back to the reactor.

When removing the gas/solids mixture from the reactor, it is desired to maximize the solids removal while minimizing the fluidizing gas removal. One removal option is attaching a valve assembly directly to the reactor and continuously draining the mixture of the solid polymeric granules and the gases from the reactor. Conventional valve assemblies, however, typically have low solids withdrawal efficiency, as a large portion of unreacted feed and gases is simultaneously removed, which must be separated and recovered for reuse. Such recovery processes add cost to the overall polymer production process, thus the capacities of those processes should be reduced to the extent possible to minimize equipment size and energy consumption.

Accordingly, there is a need to develop methods and systems that improve the collection efficiency of solids (e.g., polymeric granules) generated in a fluidized bed while minimizing simultaneous collection of other components, such as unreacted feed and gases.

SUMMARY OF THE INVENTION

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

Disclosed is a fluidized reactor system, preferably a gas phase fluidized bed reactor, that includes a reactor containing a fluidized bed situated above a distributor plate arranged within the reactor, a fluidizing gas fed into the fluidized bed via the distributor plate to cause uniform fluidization of the fluidized bed and promote creation of solid polymeric granules, and a valve assembly penetrating a sidewall of the reactor to remove a mixture of the fluidizing gas and the solid polymeric granules from the fluidized bed. The valve assembly may be coupled to the sidewall at a downward angle relative to the sidewall such that an upward-facing opening of the valve assembly extends into the fluidized bed.

Also disclosed is a method is disclosed and includes containing a fluidized bed within a reactor above a distributor plate, feeding a fluidizing gas into the fluidized bed via the distributor plate and thereby causing uniform fluidization of the fluidized bed and promoting creation of solid polymeric granules, and removing a mixture of the fluidizing gas and the solid polymeric granules from the fluidized bed via a valve assembly penetrating a sidewall of the reactor. The valve assembly may be coupled to the sidewall at a downward angle relative to the sidewall such that an upward-facing opening of the valve assembly extends into the fluidized bed.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present disclosure is related to polyolefin production and, more particularly, to valve assemblies that promote efficient and continuous removal of solid polymeric granules from fluidized gas phase reactors.

Embodiments described herein disclose systems and methods for removing a solid polymeric granule product from a fluidized reactor bed. Suitable systems include a reactor containing a fluidized bed situated above a distributor plate arranged within the reactor, and a fluidizing gas fed into the fluidized bed via the distributor plate to cause uniform fluidization of the fluidized bed and promote creation of solid polymeric granules. A valve assembly penetrates a sidewall of the reactor to remove the solid polymeric granules from the fluidized bed. The valve assembly may be coupled to the sidewall at a downward angle relative to the sidewall such that an upward-facing opening of the valve assembly extends into the fluidized bed, which improves the collection efficiency of solid product when compared to systems having a valve assembly that is attached perpendicular to the sidewall.

Figure 1:
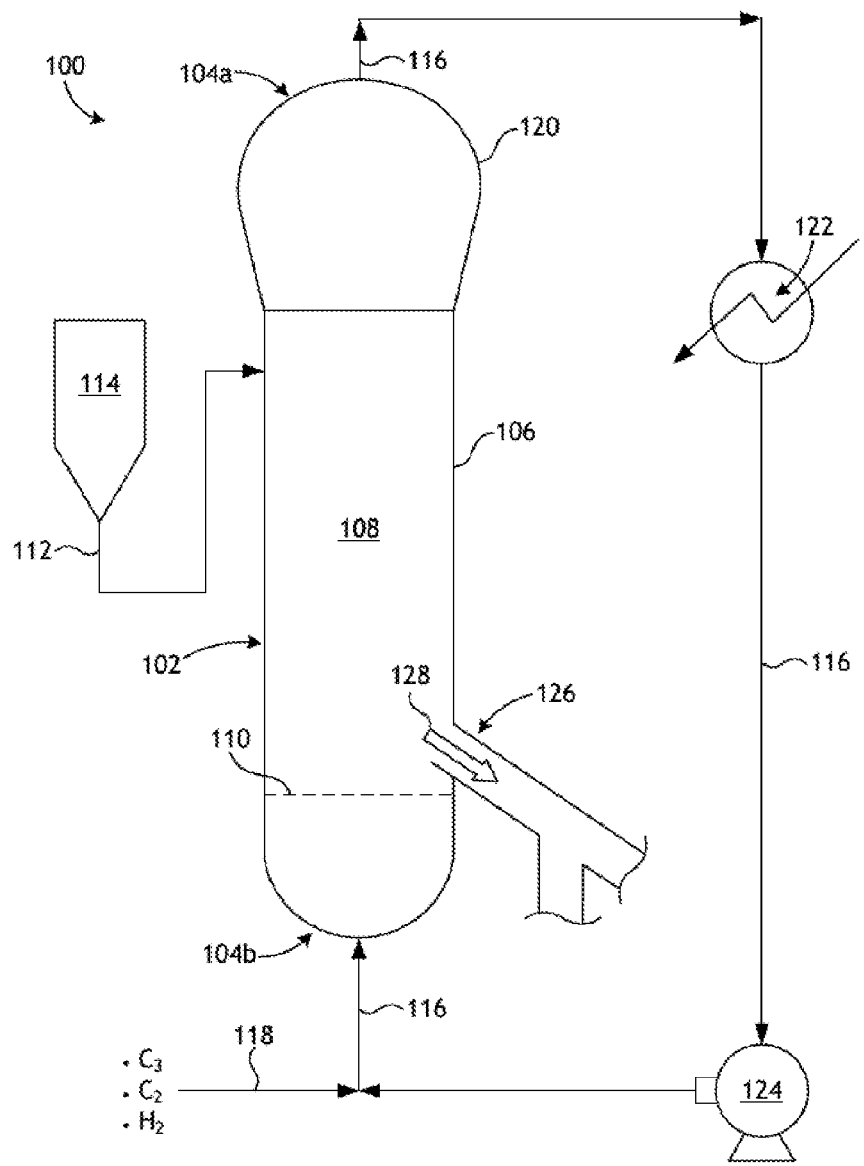
FIG. 1 is a schematic diagram of an example fluidized bed reactor system operable to create and discharge polymeric granules, according to one or more embodiments.

FIG. 1 is a schematic diagram of an example fluidized reactor system 100 operable to create and discharge solid polymeric granules, according to one or more embodiments. In at least one embodiment, the system 100 may be configured to polymerize propylene and ethylene under controlled conditions to produce an amorphous bipolymer rubber (aEP) within a porous polypropylene homopolymer that has been fed into a reactor 102 with residual catalyst activity, thus imparting an impact resistance to the polypropylene, and discharge an impact copolymer (ICP) in the form of solid polymeric granules. As illustrated, the system 100 may include the reactor 102 (alternately referred to herein as "reactor 102"), which may generally comprise an enclosed vessel having a top 104*a*, a bottom 104*b*, and a substantially vertical sidewall 106 extending between the top 104*a* and the bottom 104*b*.

The reactor 102 may contain a fluidized bed 108 generally situated above a distributor plate 110 arranged within the interior of the reactor 102 near the bottom 104*b*. A feed of catalyst or active polymer granules 112 (e.g., a polymer and an active catalyst) may be continuously or intermittently conveyed into the reactor 102 directly into or near the top of the fluidized bed 108. In at least one embodiment, the active polymer granules 112 may comprise a homopolymer and may originate from an upstream system 114, which may feed the active polymer granules 112 into the reactor 102 based on the production rate of an upstream reactor (not shown).

A fluidizing gas 116 is also continuously fed into the reactor 102 at or near the bottom 104*b* of the reactor 102. The fluidizing gas 116 can include a variety of gases and substances (besides various reactive monomers), such as an inert gas, a catalyst modifier, and a catalyst activator. A monomer make-up line 118 may add reactive monomers, such as ethylene ($C_3$), propylene ($C_2$), and hydrogen ($H_2$) to the fluidizing gas 116 to control product properties and production rate of the reactor 102.

The distributor plate 110 supports the fluidized bed 108 within the reactor 102 and comprises a porous or perforated structure that receives and distributes the fluidizing gas 116 over the cross-sectional area of the reactor 102. The high velocity at which the fluidizing gas 116 flows through the distributor plate 110 and into the reactor 102 causes uniform fluidization of the fluidized bed 108. During operation of the reactor 102, the fluidized bed 108 may contain a fluidized combination of polymer, catalyst, polymer in the process of being formed into solid polymeric granules, solid polymeric granules, and the fluidizing gas 116 that maintains fluidization.

Generally, reactor temperatures may range between about 30° C. and about 200° C. during operation. The temperature of the fluidized bed 108 may be held constant at a steady state dependent on one or more of the following factors: fluidized particle softening/sticking point; the rate of injection of catalyst or active polymer granules 112 and the catalyst activity; the temperature, pressure, and composition of the fluidizing gas 116 entering the reactor 102; and the volume of the fluidizing gas 116 circulating through the fluidized bed 108. The temperature of the fluidized bed 108 is held constant by removing the heat generated by the polymerization reaction therein, as discussed below. The pressure within the reactor 102 may range between about 650 KPa and about 15 MPa.

The portion of the fluidizing gas 116 that does not react while circulating through the fluidized bed 108 is discharged from the reactor 102 at or near the top 104*a*. In some embodiments, as illustrated, the top 104*a* of the reactor 102 may be enlarged and otherwise define an expanded dome 120 configured to reduce the upward velocity of the circulating fluidizing gas 116, which discourages entrainment of polymerizing particles and granules within the exiting fluidizing gas 116. Instead, gravitational forces urge the polymerizing particles and granules out of circulation with the fluidizing gas 116 and back downward within the reactor 102 largely along the inner wall(s) of the sidewall 106.

As the fluidizing gas 116 circulates through the fluidized bed 108, it absorbs heat generated by the chemical reaction occurring within the fluidized bed 108. The fluidizing gas 116 exiting the reactor 102 may be conveyed to a heat exchanger 122 (e.g., a cooler) fluidly coupled to the reactor 102 to remove the heat of polymerization from the fluidizing gas 116 and thereby help control the temperature inside the reactor 102. A pump or compressor 124 provides the motive force to circulate the fluidizing gas 116 through the heat exchanger 122 to remove heat from the system 100 and recycle the fluidizing gas 116 back to the reactor 102.

The system 100 may further include one or more valve assemblies 126 (one shown) coupled to the sidewall 106 of the reactor 102 and configured to remove solid polymeric to granules (e.g., polymerizing granules) created (generated) from the chemical reaction occurring within the reactor 102. During operation of the reactor 102, the fluidizing gas 116 is withdrawn from the reactor 108 through the valve assembly 126 and moving at the velocity necessary to accelerate and entrain the solid polymeric granules along and out of the reactor 102 through the valve assembly 126. More specifically, the dynamics of the ongoing reaction process and the circulating fluidizing gas 116 causes the fluidized solid polymeric granules to move generally upward near the center of the fluidized bed 108, then radially outward near the top of the fluidized bed 108 until gravitational forces cause the solid polymeric granules to generally descend along the inner wall(s) of the reactor 102. A mixture 128 of the fluidizing gas 116 and the solid polymeric granules may then be received at the valve assembly 126 and continuously drawn (discharged) from the reactor 102.

The dynamics of this process also requires that a significantly larger volume ratio of fluidizing gas 116 to solid polymeric granules (i.e., gas-to-solids ratio) be withdrawn from the reactor 102 than the volume ratio characteristic of the fluidized bed 108. More particularly, a sufficient and generally excessive volume of the fluidizing gas 116 is withdrawn with the solid polymeric granules and is needed to accelerate the granules toward the valve assembly 126, through the valve, and through any downstream piping to transfer the granules to the next system associated with the overall polymer production process.

Conventional valve assemblies for fluidized reactors are commonly attached perpendicular to the sidewall of the reactor, which requires an excessively large amount of the fluidizing gas 116 to accelerate the entrained solid polymeric granules at 90° relative to the inner wall(s) of the reactor 102 to exit the reactor 102. This results in low solids withdrawal efficiency and a high gas-to-solids ratio discharge. One purpose of the present disclosure is to introduce a valve assembly that significantly improves (reduces) the withdrawn gas-to-solids volume ratio and simultaneously reduces the cost of recovering the gas. More specifically, according to embodiments of the present disclosure, the design, placement, and orientation of the presently disclosed valve assembly 126 minimize the volume of the fluidizing gas 116 exiting the reactor 102, while taking advantage of granules acceleration by gravitational forces acting on the solid polymeric granules. Consequently, the valve assembly 126 is able to receive and discharge the mixture 128 having a significantly higher solids-to-gas ratio mixture of the fluidizing gas 116 and the solid polymeric granules as compared to conventional valve assemblies.

Figure 2:
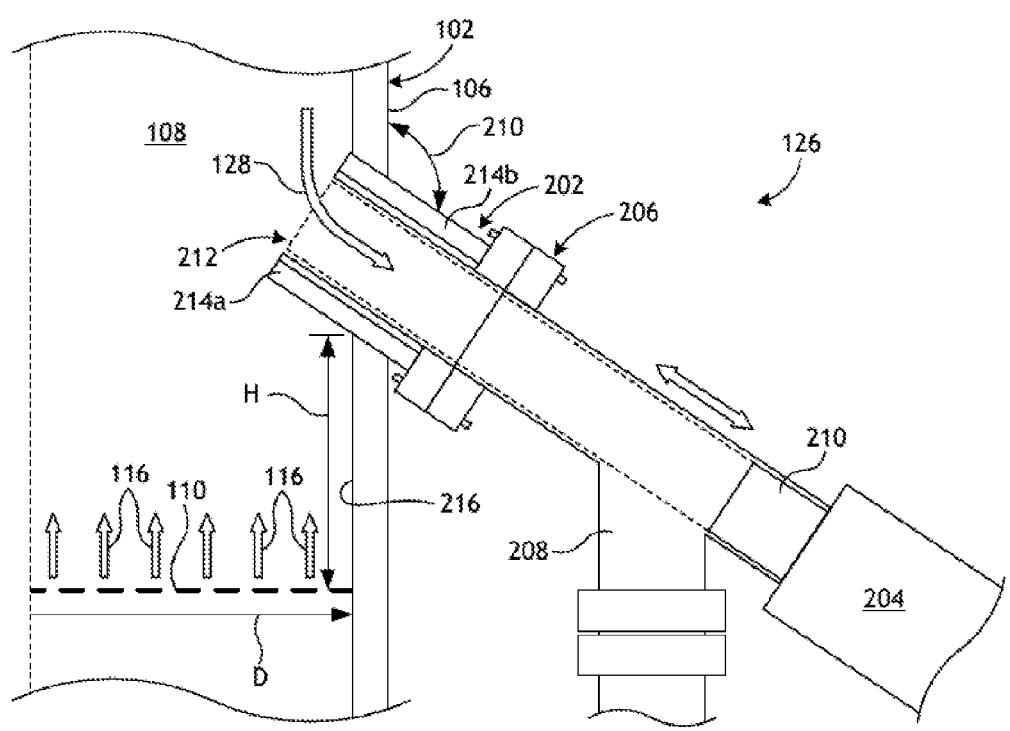
FIG. 2 is an enlarged schematic side view of the valve assembly of FIG. 1, according to one or more embodiments.

FIG. 2 is an enlarged schematic side view of the valve assembly 126, according to one or more embodiments. As illustrated, the valve assembly 126 includes a nozzle 202 and a discharge valve 204 secured to the nozzle 202 at a coupling 206. The discharge valve 204 may be actuatable to occlude or expose a discharge conduit 208 to prevent or facilitate fluid communication of the mixture 128 out of the fluidized bed 108. In polymerization applications, the discharge valve 204 is further preferred to be of design known as a discharge ram valve, which is capable of fully occluding the valve body so as to prevent any polymer growth and plugging within the valve 204. In at least one embodiment, the valve 204 may comprise an Espero discharge valve, available from Ichinose Co., Ltd. of Osaka, Japan. In other embodiments, however, the valve 204 may comprise another type of actuatable valve that may be coupled to the nozzle 202 to selectively control flow through the discharge conduit 208.

In some preferred embodiments for polymerization applications, as illustrated, the discharge valve 204 may comprise a ram valve that includes a piston or ram 210 that is longitudinally actuatable to occlude or expose the discharge conduit 208 and thereby shut off or facilitate fluid flow through the discharge conduit 208. More specifically, the ram 210 may be capable of extending into the nozzle 202 and to an opening 212 to the nozzle 202. When the ram 210 is fully extended to the opening 212, as shown by the dashed lines, the mixture 128 of the fluidizing gas 116 and the solid polymeric granules may be totally prevented from entering the nozzle 202, which may be advantageous in preventing polymer from entering the nozzle 202 and solidifying within the nozzle 202. In contrast, when the ram 210 is fully retracted, the discharge conduit 208 will be exposed and the mixture 128 may enter the nozzle 202 at the opening 212 to be discharged from the fluidized bed 108 and conveyed away from the reactor 102 via the discharge conduit 208.

In some embodiments, the total flow rate of the mixture 128 exiting the reactor 102 via the discharge conduit 208 may be controlled using a downstream valve mechanism (not shown), such as an actuatable full port ball valve or the like. In some embodiments, the mixture 128 may be conveyed to a granules handling system (not shown) where the solid polymeric granules are separated from the fluidizing gas 116, and the fluidizing gas 116 is recovered, fractionated, and all or a portion is recycled back to the reactor 102, such as via the make-up line 118 (FIG. 1).

The valve assembly 126, and more particularly the nozzle 202, may be coupled to the sidewall 106 of the reactor 102, such as by welding the nozzle 202 to the sidewall 106 or using one or more mechanical fasteners. The valve assembly 126 may be coupled to the sidewall 106 at a height H above the distributor plate 110, and the distributor plate 110 may exhibit a diameter D. In some embodiments, the ratio of the height H to the diameter D (i.e., H/D) may be between about 0.25 and about 2.0, which may locate the valve assembly 126 in a typically high solids density zone within the fluidized bed 108 with a gravity-driven, generally downward flow of solids.

As illustrated, the valve assembly 126 may be coupled to the sidewall 106 of the reactor 102 at a downward angle 210 relative to the sidewall 106. More specifically, assuming that the sidewall 106 of the reactor 102 extends substantially vertical with respect to horizontal, the downward angle 210 may be greater than 90° from the sidewall 106. Thus, the downward angle 210 may be an obtuse angle and may range between greater than 90° and about 160°. In at least one embodiment, the downward angle 210 may be about 120° from the sidewall 106. The magnitude of the downward angle 210 may be limited only by the design constraints of the valve assembly 126, which would eventually intersect with the sidewall 106 of the reactor 102.

As illustrated, the nozzle 202 may penetrate the sidewall 106 of the reactor 102, and an opening 212 to the nozzle 202 may extend a short distance into the fluidized bed 108. Since the valve assembly 126 is coupled to the sidewall 106 at the downward angle 210, the opening 212 may be generally upward facing and otherwise open away from the distributor plate 110. More particularly, a bottom portion 214a of the opening 212 to the nozzle 202 may extend past an inner surface 216 of the sidewall 106, while a top portion 214b opposite the bottom portion 214a may be substantially flush with the inner surface 216. In some embodiments, "substantially flush" may mean that a small segment (portion) of the upper portion 214b may extend a small distance into the interior of the reactor 102, as illustrated. In other embodiments, however, "substantially flush" may mean that no segment (portion) of the upper portion 214b extends past the inner surface 216 of the sidewall 106. For the most part, however, the upper portion 214b of the nozzle 202 does not substantially protrude into the interior of the reactor 102 as does the bottom portion 214a, thus facilitating an "upward-facing" orientation of the opening 212, and ensuring that any such penetration would not provide an area within the reactor 102 where any fouling known to be associated with the reaction process could be initiated.

The upward-facing opening 212 may take advantage of the gravitationally-driven flow of the solid polymeric granules along the inner surface 216 of the sidewall 106. As described above, the dynamics of the reaction process occurring within the fluidized bed 108, in conjunction with the fluidizing gas 116 injected into the fluidized bed 108 via the distribution plate 110, causes solid polymeric granules to be entrained (accelerated) in the fluidizing gas 116 and move generally upward and radially outward within the reactor 102. Gravitational forces eventually overcome the entrainment forces of the fluidizing gas 116 and the solid to polymeric granules begin to descend largely along the inner surface 216 of the sidewall 106. The upward-facing opening 212 provides an angled receptacle (i.e., inlet/outlet) at the inner surface 216 of the sidewall 106 into or through which the mixture 128 may be received from the fluidized bed 108 and conveyed away from the reactor 102. In contrast to conventional valve assemblies, the mixture 128 does not need to be accelerated (impelled) at 90° to enter the valve assembly 126, rather the mixture 128 can be received within the upward-facing opening 212 largely under gravitational effects as it descends along the inner surface 216 of the sidewall 106.

Based on the notion that high velocity of the fluidizing gas 116 is required to maximize the entrainment of the solid polymeric granules from the fluidized bed 108 and transfer out of the reactor 102, conventional, perpendicularly arranged valve assemblies for fluidized reactors typically have an opening with a relatively small diameter, such as 3 to 4 inches. In contrast, embodiments of the valve assembly 126 do not rely as heavily on gas velocity or entrainment for solids collection. Rather, strategic orientation of the valve assembly 126 at the downward angle 210 and having the upward-facing opening 212 extend into the interior of the reactor 102 allows a gravitationally driven flow of solid polymeric granules along the inner surface 216 of the sidewall 106 to be received within the valve assembly 126 with a high solids-to-gas ratio. Consequently, the velocity of the fluidizing gas 116 exiting through the valve assembly 126 is not as vital in removing the solid polymeric granules from the reactor 102. As a result, the diameter of the opening 212 may be larger than the typical diameter of conventional, perpendicularly arranged valve assemblies and nonetheless obtain a high solids-to-gas ratio, in fact, generally further improving the solids-to-gas withdrawal ratio.

In some applications, for example, the diameter of the opening 212 may be 1 to 1.5 times larger than the typical diameter of conventional, perpendicularly arranged valve assemblies. As an example, a 5 inch diameter valve replacing a 4 inch diameter valve can increase the valve withdrawal by about 60%. In some embodiments, however, the diameter of the opening 212 may be as small as 1 inch.

EMBODIMENTS LISTING

The present disclosure provides, among others, the following embodiments, each of which may be considered as optionally including any alternate embodiments.

Clause 1. A fluidized reactor system, preferably gas phase, including a reactor containing a fluidized bed situated above a distributor plate arranged within the reactor, a fluidizing gas fed into the fluidized bed via the distributor plate to cause uniform fluidization of the fluidized bed and promote creation of solid polymeric granules, and a valve assembly penetrating a sidewall of the reactor to remove a mixture of the fluidizing gas and the solid polymeric granules from the fluidized bed, wherein the valve assembly is coupled to the sidewall at a downward angle relative to the sidewall such that an upward-facing opening of the valve assembly extends into the fluidized bed.

Clause 2. The system of Clause 1, wherein the downward angle is greater than 90° from the sidewall.

Clause 3. The system of Clause 2, wherein the downward angle ranges between greater than 90° and about 160° from the sidewall.

Clause 4. The system of any of the preceding Clauses, wherein a bottom portion of the upward-facing opening extends past an inner surface of the sidewall, and wherein a top portion of the upward-facing opening opposite the bottom portion is substantially flush with the inner surface.

Clause 5. The system of any of the preceding Clauses, wherein the valve assembly comprises a nozzle coupled to the sidewall and defining the upward-facing opening, and a discharge valve secured to the nozzle.

Clause 6. The system of Clause 5, wherein the discharge valve comprises a ram valve including a ram actuatable to occlude or expose a discharge conduit to facilitate fluid communication out of the fluidized bed.

Clause 7. The system of any of the preceding Clauses, wherein the valve assembly is coupled to the sidewall at a height above the distributor plate and the distributor plate exhibits a diameter, and wherein a ratio of the height to the diameter is between about 0.25 and about 2.0.

Clause 8. The system of any of the preceding Clauses, wherein the fluidizing gas conveys the solid polymeric granules up near a center of the bed, which then descend along an inner wall of the reactor to be received by the upward-facing opening of the valve assembly.

Clause 9. The system of any of the preceding Clauses, wherein the upward-facing opening exhibits a diameter of at least 1 inch.

Clause 10. The system of any of the preceding Clauses, further comprising a feed of active polymer granules into the reactor directly into or near a top of the fluidized bed.

Clause 11. The system of any of the preceding Clauses, wherein the fluidizing gas comprises gases selected from the group consisting of an inert gas, a catalyst modifier, a catalyst activator, one or more reactive monomers, and any combination thereof.

Clause 12. The system of any of the preceding Clauses, further comprising a cooler fluidly coupled to the reactor to receive and cool a portion of the fluidizing gas discharged from the reactor, and a compressor that circulates the portion of the fluidizing gas back to the reactor.

Clause 13. A method includes containing a fluidized bed within a reactor above a distributor plate, feeding a fluidizing gas into the fluidized bed via the distributor plate and thereby causing uniform fluidization of the fluidized bed and promoting creation of solid polymeric granules, and removing a mixture of the fluidizing gas and the solid polymeric granules from the fluidized bed via a valve assembly penetrating a sidewall of the reactor, wherein the valve assembly is coupled to the sidewall at a downward angle relative to the sidewall such that an upward-facing opening of the valve assembly extends into the fluidized bed.

Clause 14. The method of Clause 13, wherein the downward angle is greater than 90° from the sidewall, the method further comprising driving the solid polymeric granules downward along an inner surface of the sidewall under the force of gravity, and receiving the mixture of the fluidizing gas and the solid polymeric granules into the upward-facing opening as the solid polymeric granules advance downward along the inner surface of the sidewall.

Clause 15. The method of Clause 13 or Clause 14, wherein a bottom portion of the upward-facing opening extends past an inner surface of the sidewall, and wherein a top portion of the upward-facing opening opposite the bottom portion is substantially flush with the inner surface.

Clause 16. The method of any of Clauses 13 to 15, wherein the valve assembly comprises a nozzle coupled to the sidewall and defining the upward-facing opening, and a discharge valve secured to the nozzle, the method further comprising receiving the mixture of the fluidizing gas and the solid polymeric granules into the upward facing-opening as the solid polymeric granules advance downward along an inner surface of the sidewall.

Clause 17. The method of Clause 16, wherein the discharge valve comprises a ram valve including a ram, the method further comprising actuating the ram to occlude or expose a discharge conduit and thereby facilitate fluid communication out of the fluidized bed.

Clause 18. The method of any of Clauses 13 to 17, wherein the valve assembly is coupled to the sidewall at a height above the distributor plate and the distributor plate exhibits a diameter, and wherein a ratio of the height to the diameter is between about 0.25 and about 2.0.

Clause 19. The method of any of Clauses 13 to 18, further comprising feeding active polymer granules into the reactor at or near a top of the fluidized bed.

Clause 20. The method of any of Clauses 13 to 19, further comprising discharging a portion of the fluidizing gas from the reactor, receiving and cooling the portion of the fluidizing gas with a cooler, and recycling the portion of the fluidizing gas back to the reactor with a compressor.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

All numerical values within the detailed description and the claims herein are modified by "about" or "approximately" with respect to the indicated value, and take into account experimental error and variations that would be expected by a person having ordinary skill in the art. Unless otherwise indicated, room temperature is about 25° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A", and "B."

While compositions and methods are described herein in terms of "comprising" various components or steps, the compositions and methods can also "consist essentially of" or "consist of" the various components and steps.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein.

The invention claimed is:

1. A fluidized reactor system, comprising:
   a reactor containing a fluidized bed situated above a distributor plate arranged within the reactor;
   a fluidizing gas fed into the fluidized bed via the distributor plate to cause uniform fluidization of the fluidized bed and promote creation of solid polymeric granules; and
   a valve assembly penetrating a sidewall of the reactor to remove a mixture of the fluidizing gas and the solid polymeric granules from the fluidized bed,
   wherein the valve assembly is coupled to the sidewall at a downward angle relative to the sidewall such that an upward-facing opening of the valve assembly extends into the fluidized bed.

2. The system of claim 1, wherein the downward angle is greater than 90° from the sidewall.

3. The system of claim 2, wherein the downward angle ranges between greater than 90° and about 160° from the sidewall.

4. The system of claim 1, wherein a bottom portion of the upward-facing opening extends past an inner surface of the sidewall, and wherein a top portion of the upward-facing opening opposite the bottom portion is substantially flush with the inner surface.

5. The system of claim 1, wherein the valve assembly comprises:
   a nozzle coupled to the sidewall and defining the upward-facing opening; and
   a discharge valve secured to the nozzle.

6. The system of claim 5, wherein the discharge valve comprises a ram valve including a ram actuatable to occlude or expose a discharge conduit to facilitate fluid communication out of the fluidized bed.

7. The system of claim 1, wherein the valve assembly is coupled to the sidewall at a height above the distributor plate and the distributor plate exhibits a diameter, and wherein a ratio of the height to the diameter is between about 0.25 and about 2.0.

8. The system of claim 1, wherein the fluidizing gas conveys the solid polymeric granules up near a center of the bed, which then descend along an inner wall of the reactor to be received by the upward-facing opening of the valve assembly.

9. The system of claim 1, wherein the upward-facing opening exhibits a diameter of at least 1 inch.

10. The system of claim 1, further comprising a feed of active polymer granules into the reactor directly into or near a top of the fluidized bed.

11. The system of claim 1, wherein the fluidizing gas comprises gases selected from the group consisting of an inert gas, a catalyst modifier, a catalyst activator, one or more reactive monomers, and any combination thereof.

12. The system of claim 1, further comprising:
   a cooler fluidly coupled to the reactor to receive and cool a portion of the fluidizing gas discharged from the reactor; and
   a compressor that circulates the portion of the fluidizing gas back to the reactor.

13. A method, comprising:
   containing a fluidized bed within a reactor above a distributor plate;
   feeding a fluidizing gas into the fluidized bed via the distributor plate and thereby causing uniform fluidization of the fluidized bed and promoting creation of solid polymeric granules; and
   removing a mixture of the fluidizing gas and the solid polymeric granules from the fluidized bed via a valve assembly penetrating a sidewall of the reactor, wherein the valve assembly is coupled to the sidewall at a downward angle relative to the sidewall such that an upward-facing opening of the valve assembly extends into the fluidized bed.

14. The method of claim 13, wherein the downward angle is greater than 90° from the sidewall, the method further comprising:
driving the solid polymeric granules downward along an inner surface of the sidewall under the force of gravity; and
receiving the mixture of the fluidizing gas and the solid polymeric granules into the upward-facing opening as the solid polymeric granules advance downward along the inner surface of the sidewall.

15. The method of claim 13, wherein a bottom portion of the upward-facing opening extends past an inner surface of the sidewall, and wherein a top portion of the upward-facing opening opposite the bottom portion is substantially flush with the inner surface.

16. The method of claim 13, wherein the valve assembly comprises a nozzle coupled to the sidewall and defining the upward-facing opening, and a discharge valve secured to the nozzle, the method further comprising receiving the mixture of the fluidizing gas and the solid polymeric granules into the upward facing-opening as the solid polymeric granules advance downward along an inner surface of the sidewall.

17. The method of claim 16, wherein the discharge valve comprises a ram valve including a ram, the method further comprising actuating the ram to occlude or expose a discharge conduit and thereby facilitate fluid communication out of the fluidized bed.

18. The method of claim 13, wherein the valve assembly is coupled to the sidewall at a height above the distributor plate and the distributor plate exhibits a diameter, and wherein a ratio of the height to the diameter is between about 0.25 and about 2.0.

19. The method of claim 13, further comprising feeding active polymer granules into the reactor at or near a top of the fluidized bed.

20. The method of claim 13, further comprising:
discharging a portion of the fluidizing gas from the reactor;
receiving and cooling the portion of the fluidizing gas with a cooler; and
recycling the portion of the fluidizing gas back to the reactor with a compressor.

* * * * *